(No Model.)
C. D. MOSHER.
TUBE EXPANDER.
No. 559,189.                    Patented Apr. 28, 1896.
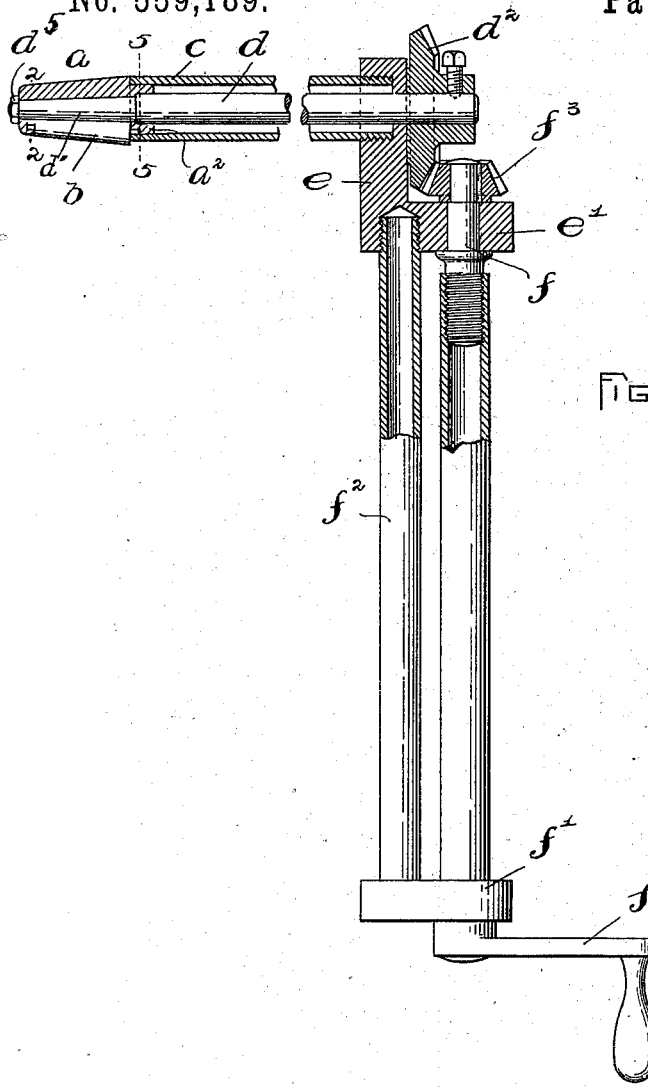
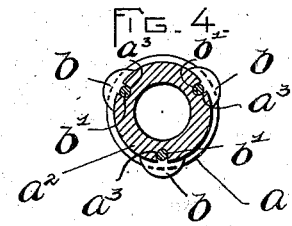
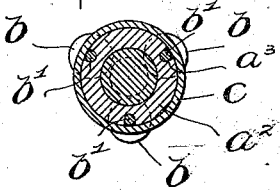
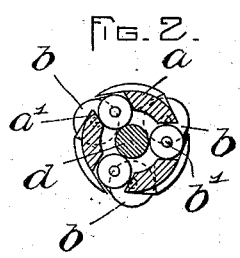
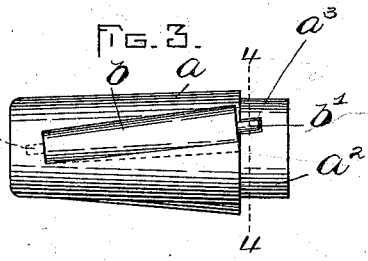
WITNESSES:
A. D. Hanson
J. P. Davis
INVENTOR:
C. D. Mosher
by Wright Brown Roosely
Attys

UNITED STATES PATENT OFFICE.

CHARLES D. MOSHER, OF NEW YORK, N. Y.

TUBE-EXPANDER.

SPECIFICATION forming part of Letters Patent No. 559,189, dated April 28, 1896.

Application filed January 30, 1894. Serial No. 498,459. (No model.)

*To all whom it may concern:*

Be it known that I, CHARLES D. MOSHER, of New York, in the county of New York and State of New York, have invented certain new and useful Improvements in Tube-Expanders, of which the following is a specification.

This invention relates to certain improvements in tube-expanders, one object being to provide a construction which will increase the durability of the rollers in that class of tube-expanders employing rollers in the mandrel.

Another object of the invention is to adapt the expander for use in that class of steam-boilers where the tubes are inaccessible to an expander of the usual form—such, for example, as the boiler shown in Patent No. 472,309, granted to me April 5, 1892, wherein groups of tubes connecting steam and water drums enter the said drums throughout their length—and the employment of a tube-expander in which the operating means are applied directly to the spindle of the mandrel is not feasible.

To the above ends the invention consists in certain novel constructions and arrangements of parts hereinafter described and claimed.

The accompanying drawings illustrate a construction for carrying out the invention.

Figure 1 shows a part side elevation and part longitudinal section of the tube - expander. Fig. 2 shows a cross-section on line 2 2 of Fig. 1. Fig. 3 shows a side elevation, on an enlarged scale, of a mandrel detached. Fig. 4 shows a section on line 4 4 of Fig. 3. Fig. 5 shows a section on line 5 5 of Fig. 1.

The same letters of reference indicate the same parts in all the figures.

In the drawings the letter $a$ designates a tapered mandrel formed with longitudinally-extending angularly-disposed roller-receiving recesses $a'$ and having a reduced shank $a^2$. The recesses $a'$ extend to the shank $a^2$, and open bearings $a^3$ are formed in the latter and extend from the said recesses. Tapered rollers $b$ occupy the recesses $a'$ and are provided with trunnions $b'$, stepped at the front end into bearings receding from the front end walls of the recesses, and the trunnions at the rear end occupying the bearings $a^3$. Said latter trunnions are confined in their bearings by a collar $c$, which embraces the shank $a^2$ and covers the open bearings $a^3$. The mandrel is mounted on the spindle $d$, having a tapered portion $d'$, which supports the rolls against lateral pressure, the mandrel being held securely on the spindle by a nut $d^5$, screwing on the end of the spindle and against the mandrel.

The collar $c$ is elongated and fastened in a support $e$, and said collar constitutes a bearing supporting the mandrel and transfers the end thrust of the mandrel from the spindle $d$ to the support $e$, thus providing for the operation of the gears $d^2 f^3$ without binding. The spindle $d$ is carried through the support $e$, which constitutes a bearing therefor, and a bevel-gear $d^2$ is affixed to said spindle on the rear side of the support. The said support $e$ has an arm $e'$ extending at right angles to the arm supporting the spindle $d$, said arm $e'$ affording a bearing for one end of a spindle $f$, whose opposite end is supported in a bearing $f'$, affixed to a rod $f^2$, fastened in the support $e$. A bevel-gear $f^3$ is affixed to the inner end of the spindle $f$ and meshes with the gear $d^2$, and a handle $f^4$ is affixed to the outer end of said spindle $f$. Said spindle $f$ is here shown as composed of two members, one of which is tubular and internally screw-threaded to receive the other, which is correspondingly screw-threaded; but this construction is not essential.

It will now be seen that a tube-expander of the above construction can be operated from a point considerably removed laterally from the tube, and thus is adapted for use in boilers of the class before mentioned, the tube-expander being introduced at the end of the drum and the mandrel entered in the tube to be expanded, and then by operating the handle $f^4$ the expansion of the tube is accomplished. The spindle $f$ may be of any length necessary to attain access to the tubes.

It will be seen that the objects of my invention, as primarily set up, are fulfilled by the constructions above described.

I claim—

1. A tube-expander comprising a mandrel having longitudinal inclined or diagonal slots, tapering rolls loosely inserted in said slots and having trunnions projecting into bearings at the ends of the slots, a spindle passing through the mandrel and supporting the peripheries of the rolls against lateral pressure, a bevel-gear affixed to said spindle, a support or holder having a bearing for said spindle, means independent of the spindle for taking the end thrust of the mandrel and an operating-shaft journaled in other bearings in said support and having a bevel-gear meshing with the gear on the spindle.

2. A tube-expander comprising in its construction a support having a tubular bearing or sleeve, a spindle journaled in said sleeve and having an expanding-mandrel at its outer end and a bevel-gear at its inner end, a rod affixed to said support and extending at right angles with the spindle, said rod having a bearing attached to its outer end, and an operating-shaft journaled at one end in the support and at the other end in said bearing, said operating-shaft having at one end a bevel-gear meshing with the gear of the mandrel-spindle, and at the other end a crank, all arranged and operating substantially as set forth.

In testimony whereof I have signed my name to this specification, in the presence of two subscribing witnesses, this 26th day of December, A. D. 1893.

CHARLES D. MOSHER.

Witnesses:
  C. F. BROWN,
  A. D. HARRISON.